United States Patent [19]

Benjamin

[11] 4,071,119

[45] Jan. 31, 1978

[54] DASHPOT ASSEMBLY

[75] Inventor: Benjamin C. Benjamin, Flint, Mich.

[73] Assignee: Schmelzer Corporation, Durand, Mich.

[21] Appl. No.: 712,925

[22] Filed: Aug. 9, 1976

[51] Int. Cl.$^2$ .......... F16F 9/04

[52] U.S. Cl. .......... 188/298; 123/103 E; 261/DIG. 18; 267/123

[58] Field of Search .......... 188/270, 282, 298, 317, 188/322; 267/65 A, 122, 123; 123/103 E; 16/84; 261/DIG. 18; 251/47, 48

[56] References Cited

U.S. PATENT DOCUMENTS

| | | | |
|---|---|---|---|
| 2,696,980 | 12/1954 | Goodwin | 188/298 |
| 2,741,474 | 4/1956 | Babitch | 188/298 |
| 2,894,740 | 7/1959 | Emerson et al. | 267/123 |
| 3,081,847 | 3/1963 | Smitley | 188/298 |
| 3,266,080 | 8/1966 | Spencer | 16/84 |

*Primary Examiner*—Trygve M. Blix
*Assistant Examiner*—Edward R. Kazenske
*Attorney, Agent, or Firm*—Fisher, Gerhardt & Groh

[57] ABSTRACT

A dashpot assembly having a single annular diaphragm the inner periphery of which forms a valve movable relative to a metering passage between chambers formed at opposite sides of a plunger assembly in the dashpot. Upon movement in one direction the valve element requires air to pass through the metering passage and upon movement in the opposite direction the valve moves out of engagement to permit free flow between opposite sides of the plunger. The dashpot incorporates a ring element which serves to maintain the metering passage free of obstructions and dirt and which extends the effective area of the diaphragm.

10 Claims, 10 Drawing Figures

Fig-1
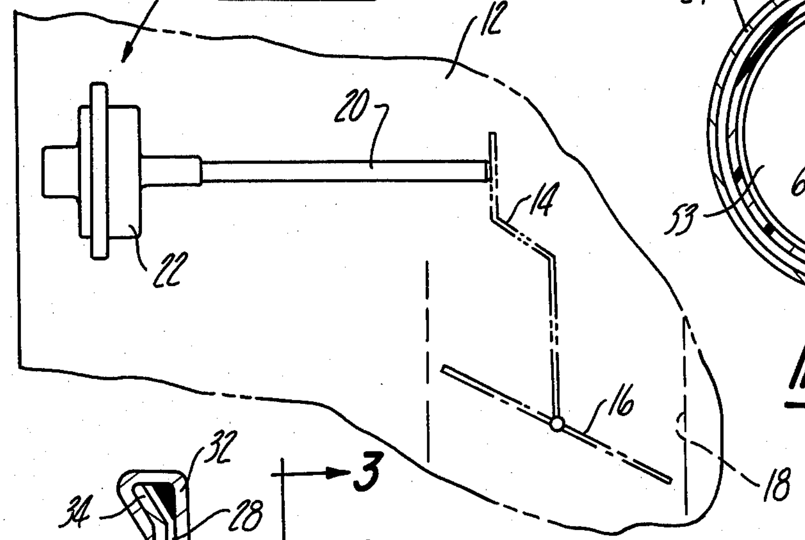
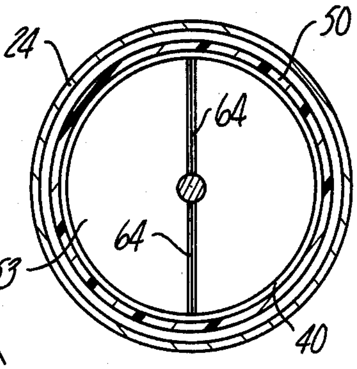
Fig-3
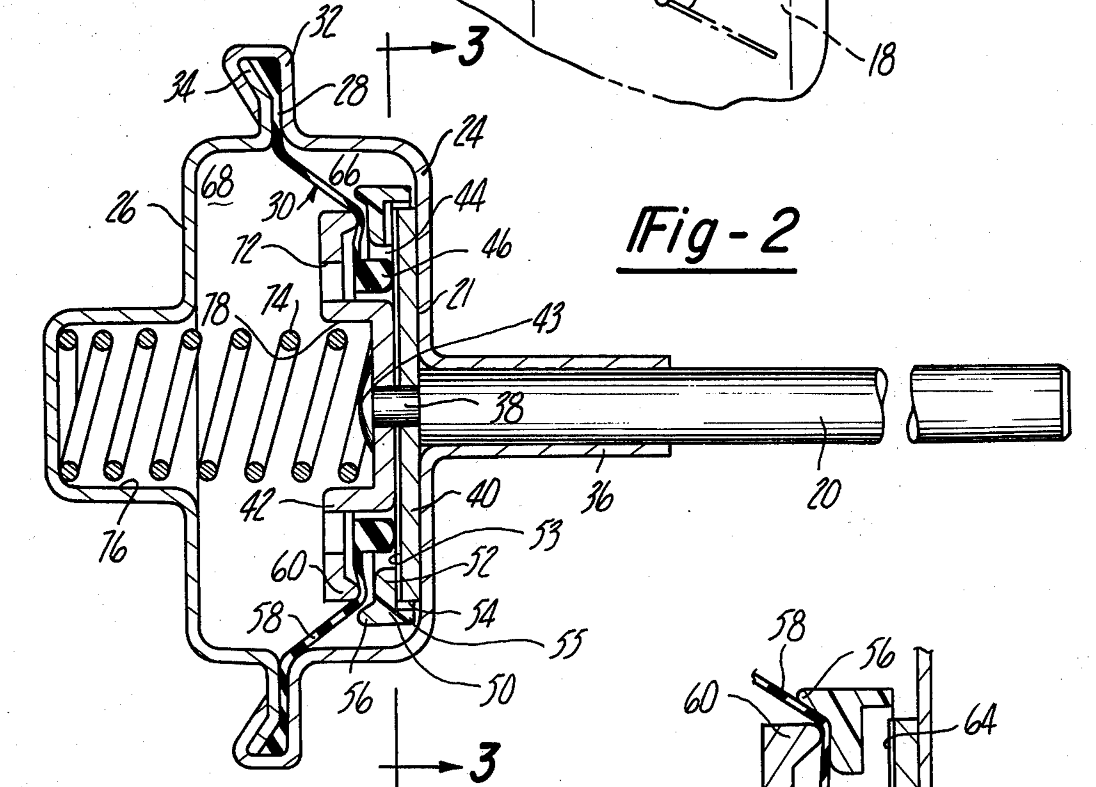
Fig-2
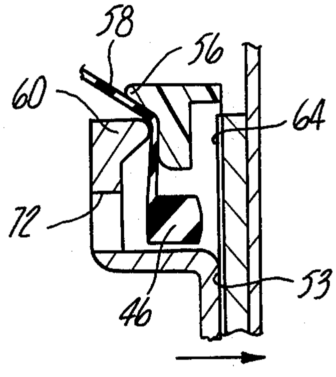
Fig-5
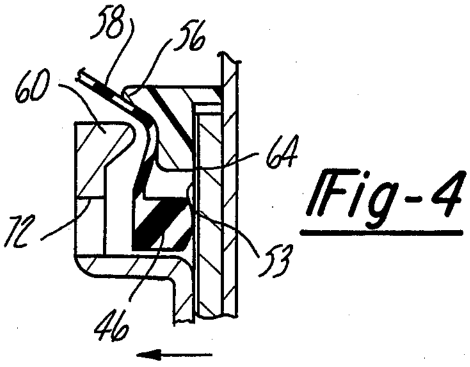
Fig-4

DASHPOT ASSEMBLY

This invention relates to dashpots and more particularly to a dashpot for use with a carburetor throttle valve to delay its final closing and thereby prevents stalling of the engine.

Current automobiles often use a dashpot to delay the final closing of a carburetor throttle valve to prevent stalling during deceleration. Such dashpots normally are mounted on a carburetor and are very small with a housing having a diameter slightly more than one inch at an axial length of approximately the same dimension. Such dashpots usually use a movable wall in the form of a piston or a diaphragm movable in one direction at a restricted rate and in another direction at an unrestricted rate. Movement at the restricted rate is under the control of some form of metering valve which due to the small size requires very small passages which easily become obstructed during operation and cause malfunctions.

It is an object of the invention to provide a dashpot arrangement employing a diaphragm which forms part of the valving mechanism for metering air from one side of the diaphragm to the other during restricted movement of the diaphragm.

Still another object of the invention is to provide a dashpot assembly in which the effective area of the diaphragm is increased by a backing element which also acts to prevent obstruction of a metering passage between chambers formed at opposite sides of the diaphragm.

Another object of the invention is to provide a dashpot in which restricted passages are completely opened and unrestricted during a portion of the cycle of operation to insure that they are cleaned and freed of any obstruction.

The dashpot embodying the invention includes a plunger assembly and an annular diaphragm the inner periphery of which forms a valve element which is closed in one direction of movement of the plunger assembly to delay movement and which separates from the plunger assembly upon movement in the opposite direction to permit free movement of the plunger assembly. The plunger assembly includes a ring element which serves to prevent the diaphragm from obstructing a metering notch through which air must flow upon movement of the plunger assembly in its delayed direction and which separates from the remainder of the plunger assembly upon return movement of the plunger to insure free air flow which also serves to maintain the passages clean. The ring acts also to engage the diaphragm at a radially outer point of the plunger assembly to increase the effective area of the diaphragm.

FIG. 1 is an elevation of the dashpot embodying the invention showing its relationship to portions of a carburetor shown diagrammatically;

FIG. 2 is a cross-sectional view at an enlarged scale of the dashpot in FIG. 1;

FIG. 3 is a cross-sectional view at a reduced scale taken on line 3—3 in FIG. 2;

FIG. 4 is a view of a portion of the dashpot seen in FIG. 2 at one stage of operation; and FIG. 5 is a view of a portion of the dashpot seen in FIG. 2 in another condition of operation.

Referring to the drawings and particularly to FIG. 1 the dashpot assembly embodying the invention is designated generally at 10 and is shown supported relative to a carburetor 12 for engagement with a lever 14 controlling the rotation of a throttle valve 16 in an air induction passage 18 of the carburetor 12. When the throttle valve 16 is moved in a counterclockwise direction as viewed in FIG. 1 and as the throttle valve 16 approaches its finally closed position the lever 14 engages a push rod 20 forming part of the dashpot 10 and the latter is operated to delay the final closing movement.

The dashpot 10 includes a housing 22 having a forward cover member 24 and a rear cover member 26 which are joined together at their outer peripheries. The forward and rearward cover members 24 and 26 engage opposite sides of a flange 28 of a diaphragm 30. The cover member 24 has a peripheral flange portion 32 folded over the flange portion 34 of the rear cover member 26 so that the flange portion 28 of the diaphragm 30 forms a gasket and the two housing members 24 and 26 are held together in fluid tight relationship to each other.

The forward cover member 24 is formed with an elongated, axially extending collar 36 which slidably receives the push rod 20 forming a portion of a plunger assembly 21. A stem 38 at one end of the push rod 20 is disposed within the housing 22 and receives a plate member 40. Also received on the stem portion 38 is a backing plate member 42 which is held together with the plate member 40 by a head portion 43 formed at the end of stem 38. The plates 40 and 42 of the plunger assembly 21 form an annular cavity 44 which receives an annular valve element 46 forming the inner annular marginal edge of the annular diaphragm 30.

The annular cavity 44 is open radially outwardly and the opening is partially closed by an annular ring member 50 which has a radially inwardly extending flange 52 engageable with the face 53 of plate member 40 adjacent the outer edge 54 and a longitudinally extending annular flange 55 encompassing the edge 54 of the plate 40. The ring 50 also is provided with an annular seat or lip 56 which in the position shown in FIG. 2 is spaced from an annular wall portion 58 of the diaphragm 30 between the flange 28 and valve element 46. In certain phases of operation the seat 56 is engageable with the wall portion 58.

The backing plate 42 also is provided with a lip or seat portion 60 disposed slightly radially inwardly from the lip portion 56 on the ring 50. In the position shown in FIG. 2 the lip portion 60 is in engagement with the wall portion 58 of the diaphragm 30.

As seen in FIG. 2 the annular valve element 46 is engaged with the face 53 of the plate member 40 and as seen in FIG. 3 the face is provided with one or more radially extending metering grooves 64. In the condition of the parts shown in FIG. 2, the annular grooves 64 form passages between the annular valve element 46 and face 53 of the plate member 40 and also between the flange 52 of the ring 50 and the plate member 40. With the annular valve element 46 in engagement with the face 53 of the plate 40 the diaphragm 30 serves to divide the housing 22 into chambers 66 and 68.

In the condition of the parts seen in FIG. 2 with the annular valve element 46 in engagement with the plate member 40, the chamber 66 and 68 are in constant communication with each other by way of the radially extending metering grooves 64 under the valve element 46 and ring 50 and through a plurality of longitudinally extended openings 72 formed in the backing plate member 42.

The parts are normally urged to the position in which they are seen in FIG. 2 by means of a spring 74 having one end seated in an axial indentation 76 formed in the cover member 26 and the opposite end is seated in a recess 78 formed in the plate member 42.

In the as molded condition of the diaphragm assembly 30 the annular valve portion 46 tends to remain engaged with the surface 53 of the plate 40 so that all communication of air between the chambers 66 and 68 must occur through the metering grooves 64. Upon application of a force on the outer end of the push rod 20 as would occur when the throttle valve 16 is urged towards its closed position, a force is applied to the left on the push rod 20 and against the action of the spring 74. Movement of the push rod 20 causes movement of the remainder of the plunger assembly 21 which in turn tends to reduce the size of the chamber 68 and increase the size of the chamber 66 causing a pressure differential to act on the diaphragm 30 and moves the diaphragm wall 58 into engagement with the lip 56 of the ring 50 as seen in FIG. 4. All air passage from the chamber 68 to the chamber 66 must pass through the metering groove 64 under the annular valve element 46 and also through the metering groove 64 between the ring 50 and the plate 40. As a consequence, movement to the left of the push rod 20 occurs at a restricted rate. In actual practice with a four pound load applied to the plunger 20, the plunger is expected to travel one half inch in 3 to 6 seconds.

When force is no longer applied to the plunger 20 pressure in the chambers 66 and 68 tend to equalize so that the spring 74 becomes effective to move the plunger 20 in the return direction. During such movement the lip or seat 60 of the backing plate 42 comes into engagement with the wall 58 of the diaphragm assembly 30 and movement of the plunger assembly causes a slight pressure differential in the chamber 66 and 68 so that diaphragm 30 flexes relative to seat 60 and the valve 46 moves out of engagement with the face 53 of the plate 40. This permits unrestricted passage of air through the openings 72 and between the valve 46 and the face 53. Air may enter the chamber 66 through the gap between the lip 56 and the wall 58 of the diaphragm or the ring 50 will move from the position in which it is seen in FIG. 2 to the position in which it is seen in FIG. 5 to expose the metering groove 64 and form a relatively large passage for air to pass from chamber 68 to 66. Movement of the ring 50 in this manner insures that the metering grooves 64 are periodically completely exposed so that moving air tends to flush any particles of dirt or the like which might accumulate in the metering grooves. Moreover, the flange 52 and the flange 55 protect the metering groove 64 from closure by the very flexible wall 58 of the diaphragm assembly 30 which in the absence of ring 50 would tend to obstruct the metering notches 64. The ring 50 also serves to extend the effective area of the diaphragm by engagement of the lip 56 radially outwardly from the periphery of the plate 40 and the lip 60 of the backing plate 42.

A dashpot assembly has been provided in which the movable wall of the dashpot is formed by an annular diaphragm the inner periphery of which forms a valve element operating in a plunger assembly. The plunger assembly is so arranged that upon movement of the plunger in one direction the movement of air from a chamber at one side of the diaphragm to a chamber at the other side of a diaphragm is restricted to flow through a metering notch. Upon movement of the dashpot in the opposite direction the valve moves out of engagement with the metering notch. The plunger incorporates a ring which insures that the metering notch remains free of obstruction by the diaphragm and also moves relative to the metering notch to insure that the latter is periodically flushed and maintained free of dirt. The ring also serves to extend the point of contact of the plunger assembly with the diaphragm to increase the effective area of the latter.

The embodiments of the invention in which an exclusive property or privilege is claimed are defined as follows:

1. A dashpot comprising; a housing, a plunger assembly movable axially in said housing and being formed with an annular cavity open radially outwardly, an annular diaphragm having its outer periphery connected to said housing in fluid tight relationship, said plunger having an annular wall in said cavity, an annular valve formed at the inner periphery of said diaphragm and being disposed in said cavity for engagement with said annular wall to form first and second fluid chambers on opposite sides of said diaphragm, a metering notch formed in said annular wall of said plunger assembly and extending radially between said valve and wall to permit continuous restricted fluid communication between said first and second chambers, a ring positioned for limited movement relative to said plunger assembly between said diaphragm and said annular wall at the outer periphery of said plunger assembly to maintain said annular valve in said cavity, said plunger assembly being movable in one direction with said valve in engagement with said wall of said plunger assembly to resist fluid flow from said first to second chamber through said metering notch to restrict movement of said plunger assembly, said plunger assembly being movable in the opposite direction to flex said annular valve out of engagement with said wall of said plunger assembly to permit relatively free fluid movement from said second chamber to said first chamber for rapid return movement of said plunger assembly.

2. The combination of claim 1 in which a portion of said metering notch disposed radially outwardly from said annular valve is separated from said diaphragm by said ring.

3. The combination of claim 2 in which said ring extends radially outwardly from the periphery of said plunger assembly and extends longitudinally in spaced relationship to the end of said metering notch to maintain the end of the latter separated from said diaphragm.

4. The combination of claim 1 in which said ring is engageable with said wall of said plunger assembly and said diaphragm upon movement of plunger in said one direction and in which said ring is engageable with said diaphragm and is moveable out of engagement with said wall of said plunger assembly upon movement of said plunger assembly in said other direction.

5. The combination of claim 1 in which said ring includes an annular seat engageable with one side of said diaphragm radially outwardly from said annular valve upon movement of said plunger assembly in said one direction, said plunger assembly including another annular seat engageable with the other side of said diaphragm radially outwardly from said annular valve upon movement of said plunger assembly in said opposite direction.

6. The combination of claim 5 in which said annular seats are spaced apart an axial distance less than the axial dimension of said annular valve and an axial distance greater than the thickness of said diaphragm.

7. The combination of claim 5 in which a gap is formed between said annular seat on said plunger assembly and said diaphragm when the latter is seated on said annular seat of said ring and in which said ring is movable relative to said plunger assembly and closes said gap upon movement of said plunger assembly in said opposite direction.

8. The combination of claim 5 in which said annular seat on said plunger assembly forms a pivot about which a portion of said diaphragm between said annular valve and said annular seat on said ring flexes during movement of said valve from engagement with said plunger assembly.

9. The combination of claim 1 in which said plunger assembly is biased to a normal position at one end of said housing.

10. A dashpot comprising; a housing, a plunger assembly movable axially in said housing and having a pair of axially spaced annular walls forming an annular cavity open radially outwardly, an annular diaphragm having its outer periphery connected to said housing in fluid tight relationship, an annular valve formed at the inner periphery of said diaphragm and being disposed in said cavity for engagement with one of said walls to form first and second fluid chambers in said housing on opposite sides of said diaphragm, a metering notch formed in said one wall of said plunger assembly and extending radially of said annular valve element to permit continuous restricted fluid communication between said first and second chambers when said valve element is in engagement with said one annular wall, a ring positioned in said cavity and extending beyond the outer periphery of said walls and said metering notch for limited axial movement relative to said plunger assembly between said diaphragm and said one wall and maintaining said annular valve in said cavity, said plunger assembly being movable in one direction to move said diaphragm into engagement with said ring to urge the latter and said valve into engagement with said one wall to resist fluid flow from said first to said second chamber through said metering notch and between said one wall at one side and side valve and ring at the other side to retard movement of said plunger assembly in one direction, said plunger assembly being movable in the opposite direction to flex said diaphragm into engagement with the other wall and flex the annular valve out of engagement with said one wall to permit axial movement of said ring and relatively free fluid flow from said second chamber to said first chamber for rapid return movement of said plunger assembly.

* * * * *

UNITED STATES PATENT AND TRADEMARK OFFICE

CERTIFICATE OF CORRECTION

PATENT NO. : 4,071,119

DATED : January 31, 1978

INVENTOR(S) : Benjamin C. Benjamin

It is certified that error appears in the above-identified patent and that said Letters Patent are hereby corrected as shown below:

After the ABSTRACT

"10 Claims, 10 Drawing Figures"

should read --10 Claims, 5 Drawing Figures--

Signed and Sealed this

*Ninth* Day of *May 1978*

[SEAL]

*Attest:*

RUTH C. MASON
*Attesting Officer*

LUTRELLE F. PARKER
*Acting Commissioner of Patents and Trademarks*